Patented Feb. 19, 1929.

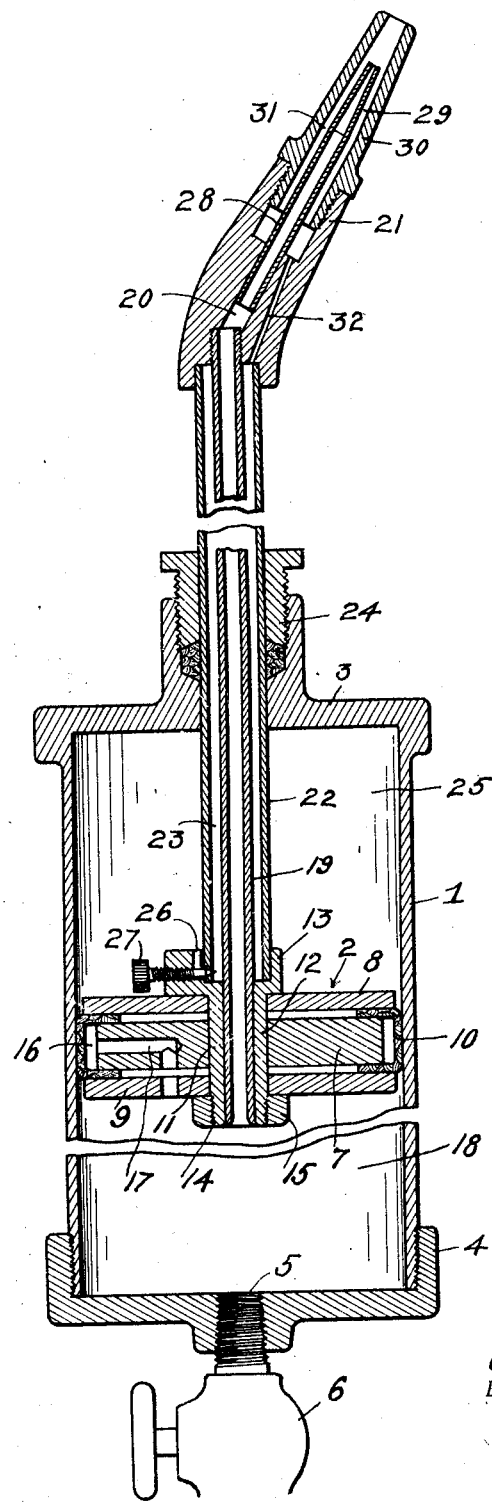

1,702,534

UNITED STATES PATENT OFFICE.

CONRAD R. BUCHET, OF LOS ANGELES, CALIFORNIA, ASSIGNOR TO NATIONAL AIR-LUB PRODUCTS INCORPORATED, OF LOS ANGELES, CALIFORNIA.

COMBINATION SPRING OILER AND MOTOR CLEANER.

Application filed January 18, 1927. Serial No. 161,813.

This invention relates to a combination spring oiler and motor cleaner and pertains more particularly to a spraying device for delivering under pressure a spray of oil, grease or cleaning fluid to the parts of an automobile or other piece of machinery, for the purpose of lubricating or cleaning the same.

The object of the invention is to provide a simple, durable and efficient device for the accomplishing of the above mentioned purposes, as well as other purposes which will become apparent from a perusal of the following specification, and an examination of the accompanying drawing, the single figure of which represents a longitudinal section through a device embodying my invention.

In carrying out the invention, 1 represents a cylinder in which is mounted for reciprocation a piston 2. The cylinder 1 is provided at one of its ends with an integral head 3 and at its opposite end with a removable threaded head 4 which in turn is provided with an inlet port 5 controlled by a valve 6.

The piston 2 comprises an annular disc 7, and washers 8 and 9 disposed adjacent opposite faces of said disc between which and the opposite faces of said washers is clamped the free ends of a U shaped annular packing ring 10 the periphery of which engages with the surface of the bore of the cylinder 1. The disc 7 and the washers 8 and 9 are provided with a centrally disposed bore 11 through which passes a bolt 12 which is provided with a head 13, engaging with the washer 8 and is threaded on its opposite end at 14 to receive a nut 15 which rests against the washer 9 and serves to clamp the ring 10 firmly in position. The diameter of the disc 7 is less than the diameter of the inner surface of the packing ring 10, thus forming an annular channel 16 between these surfaces, and leading from said channel and formed in the disc 7 and washer 9 is a port 17 which opens communication between said channel and the pressure chamber 18 formed between the piston 2 and the head 4.

Secured in a centrally disposed bore in the bolt 12 is a tube 19 which opens communication between the pressure chamber 18 and a bore 20 formed in a nozzle 21. Surrounding the tube 19 is a second tube 22 of larger internal diameter than the external diameter thereof which forms an annular passage 23 therebetween, the outer end of said tube 22 engaging in a socket in the nozzle 21 and its inner end engaging in a socket in the head 13 of bolt 12. The tube 22 is adapted to slide through a suitable packing gland 24 formed on the head 3 of the cylinder 1.

The central tube 19, as shown in the drawing, is slightly upset at its lower end so as to prevent its accidental upward withdrawal from the bore within the bolt 12. The upper end of said tube 19 has a screw-threaded engagement with the nozzle 21, hence when said nozzle is screwed into place the outside tube 22 is clamped between the socket in the base of said nozzle and the socket in the upper end of the hollow bolt 12.

Between the piston 2 and the head 3 is formed a container chamber 25 adapted to receive oil, grease or a cleaning fluid, and leading from this chamber and the annular passage 23 is a port 26 controlled by a needle valve 27 in order that the flow of the oil, grease or cleaning fluid into said passage may be regulated as desired.

Secured in the bore 20 of nozzle 21 is a tube 28 which extends into the bore 29 of a subnozzle 30 threaded into the nozzle 21, said bore being of a larger diameter than the external diameter of said tube, to form an annular passage 31 therebetween. A bore 32 is formed in the nozzle 21, which opens communication between the passages 23 and 31.

In utilizing the spraying device, the nozzle 30 is directed toward the part to be lubricated or cleaned, the chamber 25 having previously been filled with oil, grease or a cleaning fluid. Steam or air under high pressure is then admitted through port 5 into the chamber 18 which exerts pressure on the piston 2 as well as passes through the tube 19 and 28.

The contents of chamber 25 is forced by the piston 2 through the port 26 into passages 23, 32 and 31, consequently the steam or compressed air and the contents of chamber 25 become mixed at the discharge ends of nozzle 30 and pipe 28 thus thoroughly atomizing the lubricating or cleaning fluid and discharging the same with a great force upon the part to which the nozzle is directed.

The steam or compressed air, during operation, passes through the port 17 into the annular passage 16 and serves to keep the packing ring 10 pressed firmly against the inner wall of cylinder 1, thus preventing leakages between chambers 18 and 25.

Having thus described my invention what I claim is:

1. A spraying device comprising a cylinder having closed ends, a piston in said cylinder forming at its opposite sides a pressure chamber and a container chamber, an outer tube connected to said piston and extending through the container chamber end of the cylinder, an inner tube extending through said outer tube and said piston in fixed relation to said piston, a nozzle connected to the outer ends of said tubes and formed with passages connected respectively to said tubes, regulated communicating means between said container chamber and said outer tube, and means for admitting fluid under pressure into said pressure chamber.

2. In a device of the character described, a cylinder having closed ends, a piston head in said cylinder forming at its opposite sides a pressure chamber and a container chamber, a hollow bolt fixed to and extending through said piston head, said bolt having within the container chamber an expanded head, an inner tube of less external diameter than the space inclosed by said hollow bolt head, said inner tube being fixed within said hollow bolt and communicating with said pressure chamber, a nozzle outside of said container chamber having screw-threaded engagement with the outer end of said inner tube, said nozzle having a socket in its base surrounding said inner tube, an outer tube fitted within said socket at its outer end, said nozzle having passages connected with both of said tubes, said outer tube extending into said container chamber and having its inner end fitted within the aforesaid expanded head of said bolt to provide for clamping said outer tube into place when said nozzle is fully screwed down upon said inner tube, means affording communication between said container chamber and the space between said inner and outer tubes, and means for admitting fluid under pressure into said pressure chamber.

In testimony whereof I affix my signature.

CONRAD R. BUCHET.